UNITED STATES PATENT OFFICE.

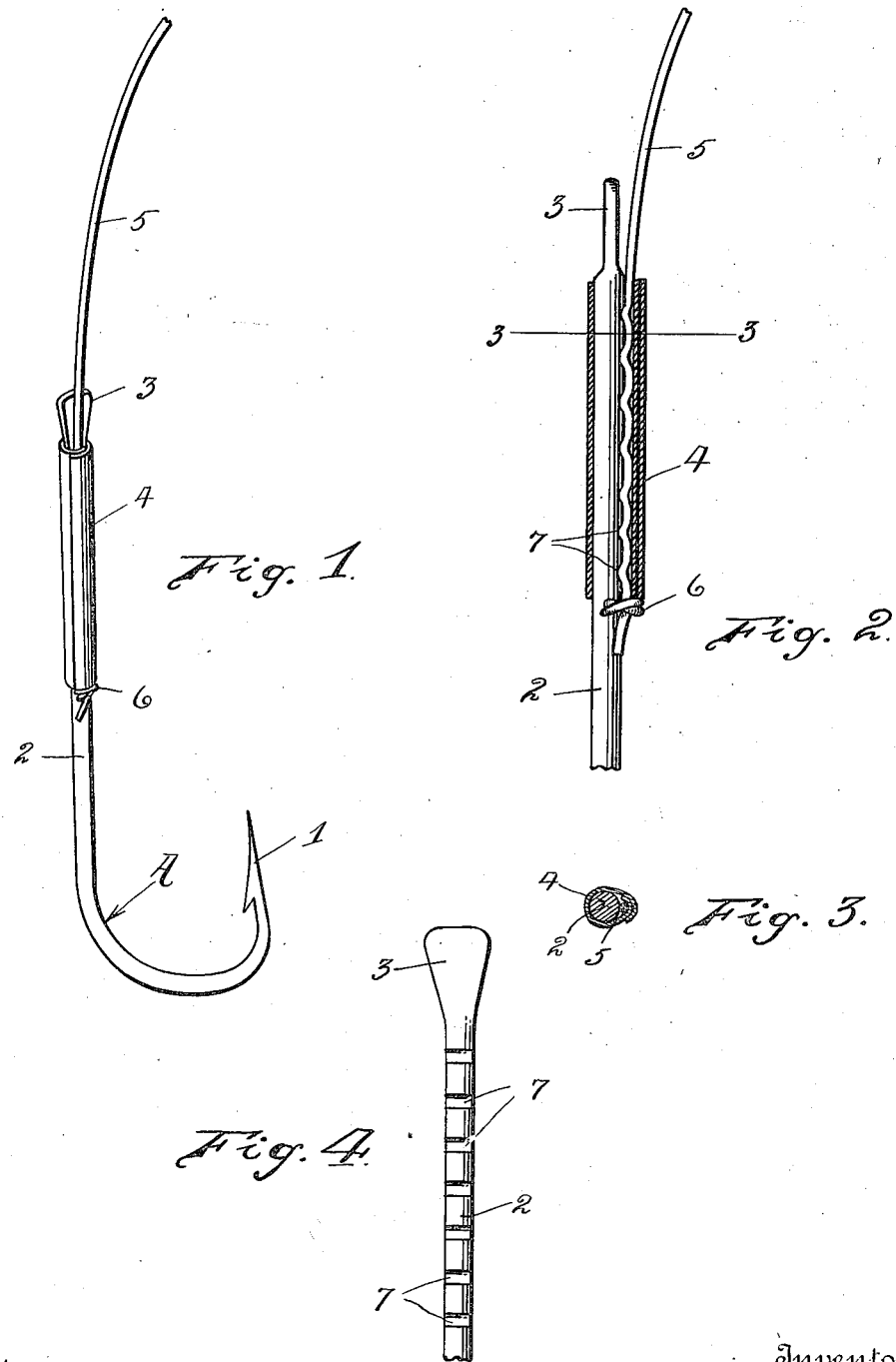

CHARLES A. KRENRICK, OF AKRON, OHIO.

FISH-HOOK.

1,156,152. Specification of Letters Patent. Patented Oct. 12, 1915.

Application filed September 29, 1914. Serial No. 864,157.

*To all whom it may concern:*

Be it known that I, CHARLES A. KRENRICK, a citizen of the United States, residing at Akron, in the county of Summit and State of Ohio, have invented certain new and useful Improvements in Fish-Hooks, of which the following is a specification.

This invention relates to fish hooks and more particularly to means for fastening the hook to the snell, or to a leader or line.

Fish hook snells are made of various substances of mineral or animal composition, such as gut, silk gimp, phosphorous bronze wire, braided and twisted or single, German silver wire, brass wire, piano wire, Japanese sea grass line, braided and twisted cotton line, silk line or linen line, but usually of gut, and the practice heretofore has been to fasten the snell, of whatever material composed, to the hook by wrapping silk thread around the hook and snell by hand and then coating the wrapping with varnish. This method is both tedious and slow and the result is unsatisfactory as the thread of the wrapping becomes frayed and loose and the fisherman frequently resorts to wrapping the thread binding with a thin soft wire to protect the binding and assure the secure holding together of the hook and snell. Another serious objection to this old style of fastening is that it is liable to be cut or injured and weakened by the teeth of the fish caught on the hook.

The object of my invention is to provide a simple, inexpensive, and efficient means for securing the hook and snell which will avoid all of the above objections to the old means, and which can be quickly and easily applied and thereby greatly reduce the cost of joining the hook and snell and very largely increasing the output of the workman. This object I accomplish as fully described in the following specification, and shown in the accompanying drawings in which like reference characters designate similar parts in all of the views.

Figure 1 is a perspective view of a fish hook having the snell fastened thereto by my improved means, Fig. 2 is an enlarged fragmentary sectional view showing the snell forced into corrugations in the shank and secured thereto by my improved means clamping them together, Fig. 3 is a cross sectional view on the line 3—3 of Fig. 2, and Fig. 4 is an enlarged fragmentary view of the shank showing corrugations therein.

The essential feature of my invention is securing the snell to the hook by a band or tubular clamp, and my invention can be carried out with a hook of the ordinary construction by laying one end of the snell along the shank of the hook and pinching the securing means together around the assembled portions of the shank and snell but in practice I prefer having a portion of the shank of the hook roughed, indented, or corrugated and the snell pressed together therein by the band pinched in place as shown in the drawings in which A designates the hook proper having the customary barb 1, and shank 2. The upper end 3 of the shank is flattened to prevent the clamp 4 from slipping off and the snell 5 is knotted at the end 6 to prevent its pulling out of the clamp.

The clamp or band 4 is made by first cutting the desired size out of a sheet of any suitable non-corrosive material that will take a tubular form and stay rigid, such for instance as German silver, brass, aluminium, etc., and is then bent or curved with its longitudinal edges separated sufficiently to permit of laying it over the shank and snell, when by hand or machine it is pressed or pinched into position, with its longitudinal edges overlapping, until it fastens the shank and snell firmly and rigidly together.

While I have shown the shank corrugated and the snell running the full length of the clamp and the knot extending beyond the end of the clamp, the shank may be smooth or have a rough surface and the snell need not run the entire length of the clamp and the knot would then come within the clamp and be concealed, but by having the knot exposed as shown the fisherman can readily see that the snell is in place and his hook secure.

In Figs 2 and 4 I have shown fragments of the hook with corrugations 7, and in Fig. 2 is also shown the snell pressed into these corrugations by the clamp 4, which appears in section on a large scale for the purpose of making this detail of construction clearly understood.

I have described and shown the band or clamp as consisting of one piece and that is the preferred form for the obvious reason that such construction is the most efficient and can be applied with the least labor, but it will be apparent that my means of fastening the hook and snell may be made in two or more pieces without departing from the spirit of my invention.

Having thus described my invention what I claim is:

1. The combination of a fish hook, a snell, and a clamping band for securing said snell to said hook, said snell extending through said band, and said band having its edges overlapping.

2. The combination of a fish hook, a snell, and a clamping band for securing said snell to said hook, said hook having its upper end flattened to prevent said band slipping, said band extending from approximately the center of the shank of said hook to said flattened portion, and said snell extending through said band and having a knot formed on its free end to prevent it pulling through said band, and said band bent around said hook and snell so that its ends overlap.

In testimony whereof I hereto affix my signature in the presence of two witnesses.

CHARLES A. KRENRICK.

Witnesses:
LUCILE H. SMITH,
LOTTIE M. RUSSELL.